(12) United States Patent
Jauregui et al.

(10) Patent No.: US 6,252,957 B1
(45) Date of Patent: Jun. 26, 2001

(54) LOW POWER LINE SELECTION CIRCUIT FOR A TELEPHONE

(75) Inventors: Mario E. Jauregui, San Bruno; Elaine C. He, San Jose; Maxim Bakaleynik, San Jose; Spencer L. Hermanson, San Jose, all of CA (US)

(73) Assignee: Teledex Corporation, San Jose, CA (US)

( * ) Notice: Subject to any disclaimer, the term of this patent is extended or adjusted under 35 U.S.C. 154(b) by 0 days.

(21) Appl. No.: 09/168,297

(22) Filed: Oct. 7, 1998

(51) Int. Cl.$^7$ .................................................... H04M 1/00
(52) U.S. Cl. ........................... 379/413; 379/158; 379/156
(58) Field of Search ..................... 379/413, 387, 379/399, 27, 30, 324, 167, 156, 158

(56) References Cited

U.S. PATENT DOCUMENTS

| | | | |
|---|---|---|---|
| 3,668,289 | 6/1972 | Fenton | 379/158 |
| 4,270,030 * | 5/1981 | Brolin et al. | 379/27 |
| 4,485,274 | 11/1984 | Jordon et al. | 379/165 |
| 4,677,662 | 6/1987 | Lott | 379/162 |
| 4,723,279 | 2/1988 | Field | 379/396 |
| 4,817,132 * | 3/1989 | Chamberlin et al. | 379/165 |
| 4,958,369 | 9/1990 | Tsuchida | 379/156 |
| 5,090,052 * | 2/1992 | Nakajima et al. | 379/159 |
| 5,117,452 * | 5/1992 | Callele et al. | 379/201 |
| 5,133,005 | 7/1992 | Kelley et al. | 379/146 |
| 5,335,263 | 8/1994 | Tsunehiro et al. | 379/58 |
| 5,343,514 * | 8/1994 | Snyder | 379/413 |
| 5,408,525 * | 4/1995 | Eldering | 379/162 |
| 5,448,636 | 9/1995 | Andreini et al. | 379/422 |
| 5,553,138 | 9/1996 | Heald et al. | 379/413 |
| 5,602,914 | 2/1997 | Andreini et al. | 379/422 |
| 5,631,955 | 5/1997 | Adams et al. | 379/387 |
| 5,633,925 | 5/1997 | Handford et al. | 379/413 |
| 5,742,671 * | 4/1998 | Parkerson et al. | 379/156 |
| 5,781,622 | 7/1998 | Ben-Zion | 379/159 |
| 5,796,789 * | 8/1998 | Eftechiou | 379/35 |
| 5,841,851 * | 11/1998 | Recht et al. | 379/156 |

OTHER PUBLICATIONS

Lancaster, "CMOS Cookbook". Howard W. Sams & Co., Inc. (Preface, pp. 168–169, 259–277), Dec. 1979.*

Panasonic Company, Panasonic Integrated Telephone System, Model No. KX–T3280, Operating Instructions Manual, pp. 2–47 (undated).

* cited by examiner

*Primary Examiner*—Stella Woo
(74) *Attorney, Agent, or Firm*—Burns Doane Swecker & Mathis LLP

(57) ABSTRACT

A line-powered circuit for connecting a telephone line to a telephone voice circuit comprised of a digital part and an analog part. The digital part is a logic circuit for generating a line connect signal that indicates a telephone line should be connected to the voice circuit. The power for operating the logic circuit is provided by the line voltage associated with the tip and ring leads of the telephone line. The analog part comprises a first switch means for connecting the voice circuit to the tip lead in response to the line connect signal, and a second switch means for connecting the voice circuit to a ring lead in response to the line connect signal.

3 Claims, 3 Drawing Sheets

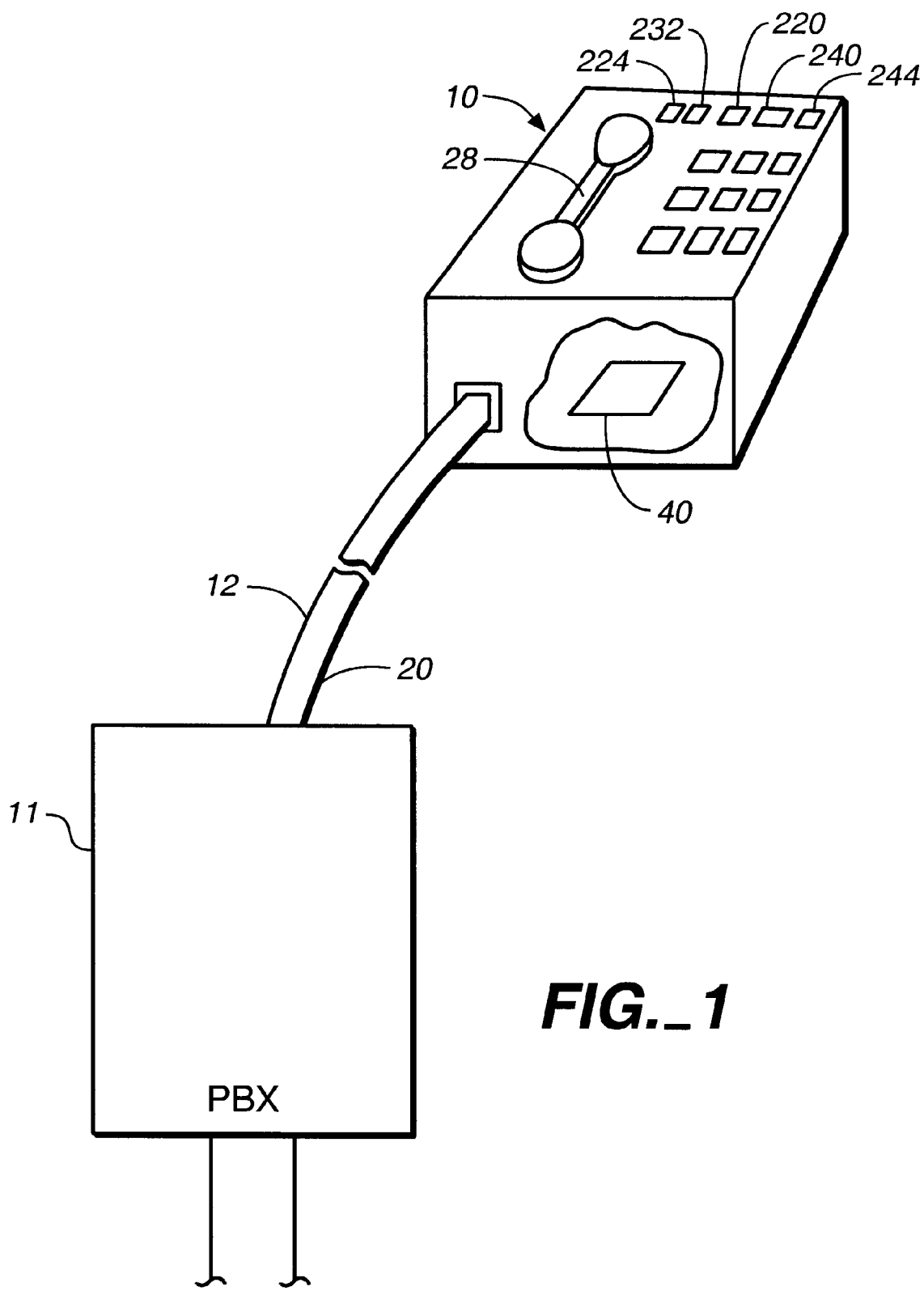
FIG._1

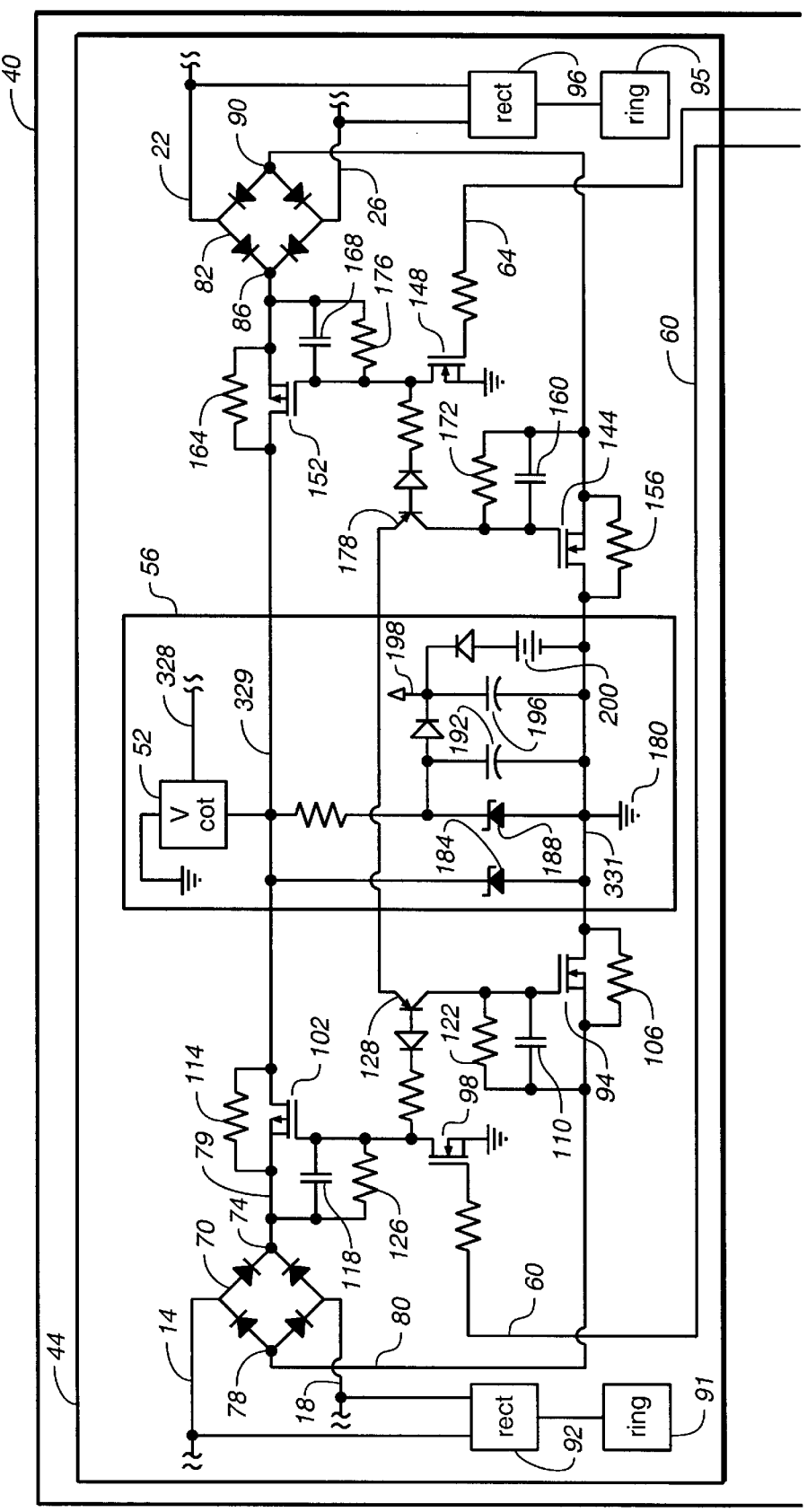
FIG._2A
FIG._2
| FIG._2A |
| FIG._2B |

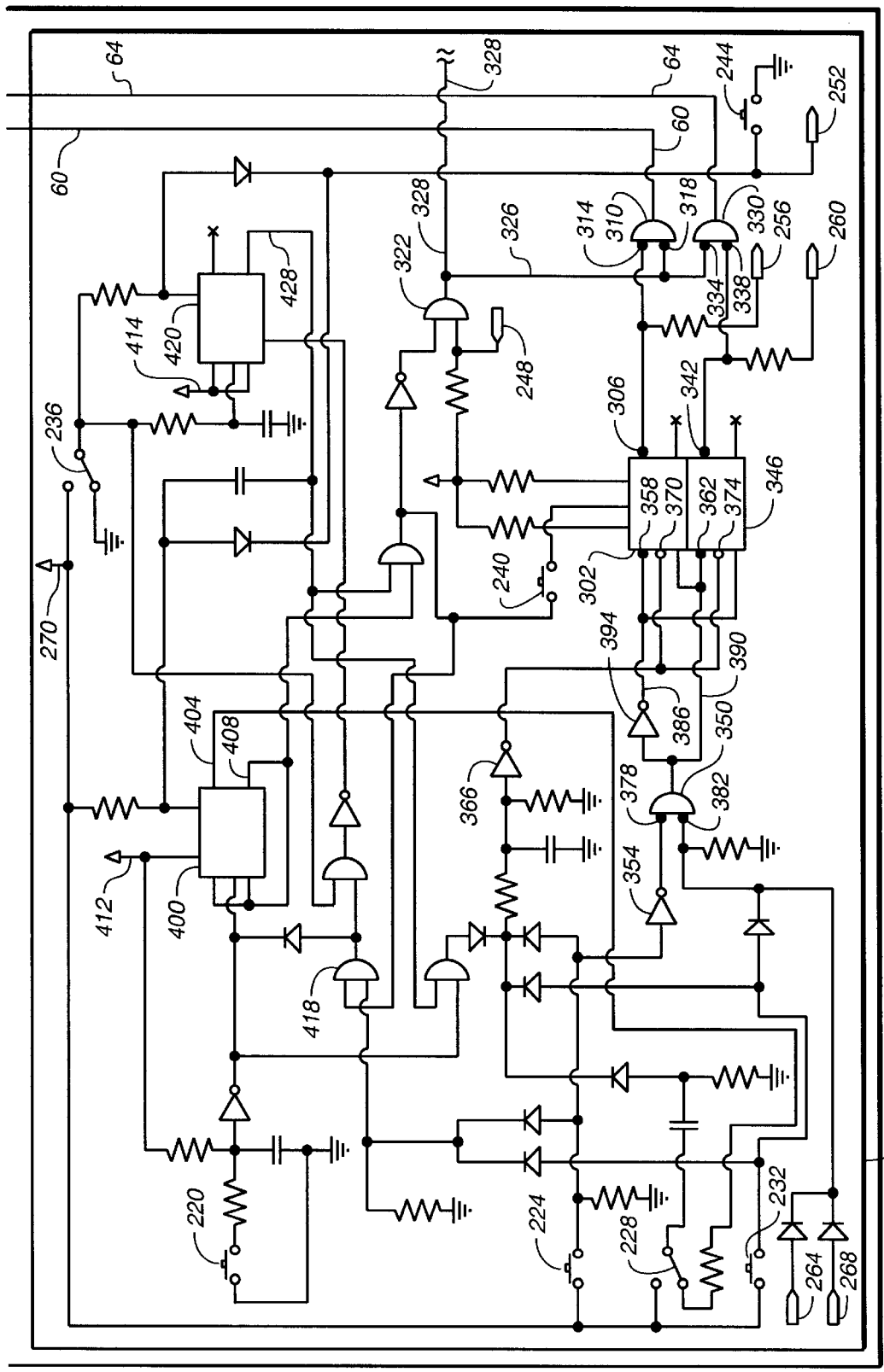
FIG._2B

LOW POWER LINE SELECTION CIRCUIT FOR A TELEPHONE

BACKGROUND OF THE INVENTION

1. Technical Field

The present invention relates to telephones having two or more lines, and more particularly to a circuit that automatically connects a line to a voice circuit in a telephone that does not have an external power source.

2. Background Information

Telephone sets having more than one line for use in a private branch exchange (PBX) system are well-known in the art. A problem with these phones is that mechanical switches are required to select which line is active. The mechanical switches must be physically activated by the phone user, such as by depressing a button to activate line one. The need to physically depress a button to connect a line can cause confusion to a person using the phone. For example, if a switch is set in one position when the telephone is answered, the line indicated by that switch position will be connected to the voice circuit in the telephone, even if the incoming call is on another line. If the person answering the phone does not physically depress the correct line select button, the call will not be connected.

Multiline telephones are also known that have logic capabilities that allow the phone to recognize which line needs to be answered. In these phones, when the user picks up the handset, or presses the speaker phone button, the phone automatically switches to the line having the incoming call. A problem with these phones is that they use a microprocessor to execute the logic functions, and need an external power line to provide the power for the microprocessor. In many situations, such as in hotels and motel industry, running an additional power line to the telephone is very undesirable. Therefore, what is needed is a multiline telephone set having logic capabilities for allowing automatic line selecting functions, but which does not require an external power supply.

BRIEF SUMMARY OF THE INVENTION

Briefly, the present invention comprises a circuit in a multiline telephone set that automatically selects the correct telephone line to connect to a voice circuit in the telephone. The circuit includes an analog part and a digital part. The digital part is a logic circuit for generating a line connect signal that indicates which telephone line should be connected to the voice circuit. The logic circuit is powered by the line voltage associated with a tip and ring leads, so an external power cord is not needed.

The analog part of the circuit comprises a first switch means and a second switch means. The first switch means connects the voice circuit to the tip lead in response to the line connect signal generated by the logic circuit. The second switch means connects the voice circuit to the ring lead in response to the line connect signal. In the absence of the line connect signal, the first and second switch means are off, thereby ensuring that the tip and ring leads are not connected to the voice circuit (i.e. the telephone is on hook). When the first and second switch means are off, a pair of large resistors connected in parallel with the first and second switch means, allow a capacitor in the analog part of the circuit to be charged by the line voltage of the tip and ring leads. The charge in the capacitor is used to power the digital circuit.

The digital part of the circuit (i.e. the logic circuit), comprises a first AND gate and a second AND gate for outputting line connect signals that indicate whether line one or line two should be connected to the voice circuit. The first and second AND gates receive signals from a pair of flip-flop circuits that output high or low signals depending on whether line one or line two should be connected to the voice circuit. The output of the flip-flop circuits is controlled by data signals and clock signals inputted into the flip-flop circuits.

A third AND gate outputs a high data signal when line two should be connected to the voice circuit. The third AND gate outputs a high data signal when line one is busy or when line two is ringing, provided that the line one select button is not pushed. Clock signals are generated when the line one or line two select buttons are pushed, when the handset goes off-hook and when the speaker phone button is pushed. The net effect of the logic circuit is that a line connect signal is sent to the analog circuit when a line is to be connected to the voice circuit. The line connect circuit causes the first switch means and a second switch means to turn on and connect the tip and ring leads to the voice circuit.

BRIEF DESCRIPTION OF THE SEVERAL VIEWS OF THE DRAWINGS

FIG. 1 is a schematic diagram of a telephone set according to the present invention; and FIG. 2 is a diagram of a circuit for enabling low power line selection according to the present invention.

DETAILED DESCRIPTION OF THE INVENTION

FIG. 1 illustrates a telephone set 10 connected to a standard PBX system 11. The telephone set 10 is a two-line phone. A first line 12 is comprised of a lead 14 and a lead 18 (shown in FIG. 2) and a second line 20 is comprised of a lead 22 and 26 (shown in FIG. 2). In each pair of leads, one of the leads is the tip lead (positive voltage) and one of the leads is the ring lead (negative voltage). In the telephone art field, it is normal for the tip ring to be at ground and the ring lead to be approximately minus forty-eight volts. In the preferred embodiment, the telephone set 10 includes a handset 28, a line one selection button 224, a line two selection button 232, a speaker phone button 220, a conference call button 240 and a hold button 244 for placing either line one or line two, or both lines on hold. The speaker phone button activates a microphone and speaker for making hands free telephone calls. A line selection circuit 40 is positioned inside of the telephone set 10.

FIG. 2 illustrates that the line selection circuit 40 is comprised of an analog circuit 44 and a digital circuit 48. The analog circuit 44 is a switch that connects line one and/or line two to a telephone voice circuit 52. The digital circuit 48 is a logic circuit that decides whether line one or line two, or both, should be connected to the telephone voice circuit 52. The analog circuit 44 comprises two identical switch circuits divided by a common circuit 56. The circuitry to the left of the common circuit 56 is the switch circuit for line one, and the circuitry to the right of the common circuit 56 is the switch circuit for line two. A lead 60 connects the digital circuit 48 to the switch circuit for line one, and a lead 64 connects the digital circuit 48 to the switch circuit for line two.

In the analog circuit 44, line one (leads 14 and 18) is connected to a rectifier 70 which ensures that a node 74 is always at a positive voltage, and that a node 78 is always at a negative voltage, regardless of which way the leads 14 and 18 are connected to the rectifier 70. A lead 79 connects node 74 to the FET 102 and a lead 80 connects node 78 to the FET 94. Similarly, line two (leads 22 and 26) is connected to a rectifier 82 which ensures that a node 86 is always at a positive voltage, and a node 90 is always at a negative voltage, regardless of which way the leads 22 and 26 are connected to the rectifier 82. A ringer 91 is connected to line one by a rectifier 92. The ringer 91 rings (gives an audible or other signal) when there is an incoming call on line one. A ringer 95 is connected to line two by a rectifier 96. The ringer 95 rings (gives an audible or other signal) when there is an incoming call on line two.

The line one switch circuit comprises an N-type MOSFET 94 and a P-type MOSFET 102. The switch circuit is operated (controlled) by an N-type MOSFET 98 and a bipolar type transistor 128. When either or both of the MOSFETs 94 and 102 are off, line one is not connected to the telephone voice circuit 52. However, when the MOSFETs 94 and 102 are off, two large value resistors 106 and 114 (approximately 2.5 MOhm) provide a path for a very small amount of current to charge a capacitor 196 in the common circuit 56. The capacitor 196 provides initial operating power to the digital circuit 48. Hence the capacitor 196 is an energy storage means. A pair of resistors 122 and 126 function to provide a bias voltage to the MOSFETs 94 and 102 to ensure that they are off when line one is not selected. A pair of capacitors 110 and 118 act as filters to reduce (prevent) circuit noise from being presented to the leads 14 and 18.

When the digital circuit 48 decides that line one should be selected, a high signal is transmitted on lead 60 from the digital circuit 48 to the MOSFET 98. When the gate of MOSFET 98 goes high, MOSFET 98 turns on causing the gate of MOSFET 102 to go low and the base of transistor 128 to go low. With the gate of MOSFET 102 low, MOSFET 102 turns on connecting the positive line one voltage (present at node 74) to the voice circuit 52, as well as to the emitter of transistor 128. With the base of the transistor 128 low, transistor 128 turns on causing the gate of MOSFET 94 to go high, thereby turning on MOSFET 94. With MOSFET 94 turned on, the negative line one voltage (present at node 78) is connected to the ground 180 of the common circuit 56.

The line two switch circuit is the mirror image of the line one switch and comprises an N-type MOSFET 144 and a P-type MOSFET 152. The line two switch circuit is operated (controlled) by an N-type MOSFET 148 and a bipolar type transistor 178. When either or both of the MOSFETS 144 and 152 are off, line two is not connected to the telephone voice circuit 52. However, when the MOSFETs 144 and 152 are off, two large value resistors 156 and 164 (approximately 2.5 MOhm) provide a path for a very small amount of current to charge the capacitor 196 in the common circuit 56. A pair of resistors 172 and 176 function to provide a bias voltage to the MOSFETs 144 and 152 to ensure that they are off when line two is not selected. A pair of capacitors 160 and 168 act as filters to reduce (prevent) circuit noise from being presented to the leads 22 and 26.

When the digital circuit 48 decides that line two should be selected, a high signal is transmitted on lead 64 from the digital circuit 48 to the MOSFET 148. When the gate of MOSFET 148 goes high, MOSFET 148 turns on causing the gate of MOSFET 152 to go low and the base of transistor 178 to go low. With the gate of MOSFET 152 low, MOSFET 152 turns on connecting the positive line two voltage present at node 86 to the voice circuit 52, as well as to emitter of transistor 178. With the base of transistor 178 low, transistor 178 turns on, causing the gate of MOSFET 144 to go high, thereby turning on MOSFET 144 which connects the negative line two voltage present at node 90 to the ground 180 of the common circuit 56.

The common circuit 56 provides a means for connecting line one and/or line two to the telephone voice circuit 52. The common circuit 56 also provides operating current to the digital circuit 48. Under normal conditions, when line one and line two are both on hook (not being used), anywhere from 24 to 48 volts is presented to the resistors 106, 114, 156 and 164. The 24 to 48 volts is the line voltage present across the leads 14 and 18 (line one), and 22 and 26 (line two). This produces sufficient current to charge the capacitor 196 which then can deliver about three volts to the digital circuit 48, as indicated by a VCC lead 198. The charge in the capacitor 96 provides sufficient voltage and current to allow the digital circuit 48 to initiate the off hook sequence (described above). In certain situations, such as when a line is busy (by an extension telephone) and the other line is not connected to the telephone, there may not be sufficient current available to adequately charge the capacitor 196. A battery 200 is provided to charge the capacitor 196 in such situations. Once off-hook, the current provided from the line allows the digital circuit 48 to perform other off-hook functions, such as hold and conference calling.

In the common circuit 56, a Zener diode 184 provides protection for the MOSFETs when a line is answered while the line is ringing. In the absence of Zener diode 184, this condition could cause a catastrophic failure of the MOSFETs because of the large voltage differential between the source and gate inputs. A Zener diode 188 provides voltage regulation for the power being supplied to the digital circuit 48 by the VCC lead 198. A capacitor 192 functions as a noise filter for the emitters of switching transistors 128 and 178.

In the preferred embodiment the telephone voice circuit 52 includes a microprocessor, dialer and speech network. In other embodiments, the circuit 52 may not include a microprocessor. The dialer is commercially available from sources such as Samsung, part number KS58015D and the speech network is available from Motorola, part number MC33215. The microprocessor is a commercially available microprocessor such as part number KS57C21516, available from Samsung. The voice circuit 52 is a circuit that allows audible signals, including voice communications, to be transmitted and received by the telephone set 10 and that allows telephone numbers to be dialed.

The digital circuit 48 processes incoming and outgoing telephone calls on line one and/or line two and makes logic decisions that simplify use of the telephone set 10. In the preferred embodiment, the digital circuit 48 allows the logic functions listed below to be implemented.

Logic Functions

1. When the telephone set is ringing and the handset is picked up, the line with the incoming call on it is automatically selected.

2. When the telephone set is ringing and the speaker phone button is pushed, the line with the incoming call on it is automatically connected to the speaker phone (speaker and microphone).

3. When the telephone set is not ringing and the handset is picked up, an available line is presented if one is available. This means that if line one is already being used when the handset is picked up, a dial tone on line two will be presented. Similarly, if line two is already being used when the handset is picked up, a dial tone on line one will be presented. If both lines are free, then a default line is selected (e.g. line one).

4. When the handset is on hook, and a line is not being used, if the line select button is pushed, the speaker phone will automatically come on for that line. This saves a step relative to phones with mechanical relays. In such phones, the line select button must be depressed, and then the speaker phone button is depressed.

5. Conference calls are completed by connecting with a first party on one line and placing that line on hold. Connection is made with a second party on the other line. The conference call button is then depressed in order to connect the first party, the second party and the party using the telephone set 10.

The digital circuit 48 comprises a plurality of digital components, including AND gates, "diode" OR gates and flip-flop circuits, for allowing the logic functions listed above to be implemented. The digital circuit 48 comprises a speaker phone button 220, a line one select button 224, a hook switch 228, a line two select button 232, a hook switch 236, a conference call button 240, a hold button 244, a flash input 248, a hold common output 252, a line one hold output 256, a line two hold output 260, a line one busy input 264 and a line two ring input 268. Power for controlling the operations of the line one select button 224, the hook switch 228 and the line two select button 232 is supplied by an VCC lead 270 which is connected to the VCC lead 198.

The digital circuit 48 processes activity on line one and/or line two, and outputs high signals on leads 60 or 64 that cause line one and/or line two to be connected to the telephone voice circuit 52. A flip-flop circuit 302 determines if the call should be directed to line one or line two. If the call is for line one, a pin 306 in the flip-flop circuit 302 outputs a high signal. An AND gate 310 receives the high signal at a pin 314. A series of other events (a truth table) will cause a pin 318 in the AND gate 310 to go high. When both of the pins 314 and 318 are high, AND gate 310 outputs a high signal on lead 60. When lead 60 is high, FET 98 in the analog circuit 44 turns on, thereby starting the sequence of events that causes line one to be connected to the telephone voice circuit 52, as was described previously with respect to the analog circuit 44.

The truth table evaluates various inputs from other circuit elements in the digital circuit 48, such as whether the telephone set has been answered. The telephone set 10 can be answered either by pressing the speaker phone button 220 or by picking up the handset. If either one of these events has occurred, then an AND gate 322 outputs a high signal on a line 326. When line 326 is high, pin 318 is high. A lead 328 directs the output of the AND gate 322 to a switching transistor within the voice circuit 52. This transistor then turns on connecting the voice circuit 52 to the common line circuit (i.e. a positive common 329 and a negative common 331).

Similarly, an AND gate 330 outputs a high signal on line 64 when an incoming call on line two is detected. AND gate 330 outputs a high signal when a pin 334 and a pin 338 are both high. Pin 334 is forced high by the same conditions that force pin 314 high. Pin 338 is forced high by a high output from a pin 342 in a flip-flop circuit 346.

The flip flop circuits 302 and 346 output high signals on the pins 306 and 342 in the following situations. An AND gate 350 and an inverter 354 form a default circuit. The output of the AND gate 350 is referred to as a "data signal" and the data signal is transmitted to a pin 358 on flip flop circuit 302 and to a pin 362 on flip flop circuit 346. The output of an inverter 366 is referred to as a "clock signal" and the clock signal is transmitted to a pin 370 on flip flop circuit 302 and to a pin 374 on flip flop circuit 346. The pin 306 will be high when pin 358 is high and a clock signal is received on pin 370. The pin 342 will be high when pin 362 is high and a clock signal is received on pin 374.

When the AND gate 350 is on, it outputs a high signal. AND gate 350 is on when a pair of pins 378 and 382 are both high. Pin 382 is forced high in the following conditions: If line two is ringing, then the line two ring input 268 will cause pin 382 to be high. If line one is busy, then the line one busy input 264 will cause pin 382 to be high. If the line two select button 232 is pushed, pin 382 will be high.

Pin 378 is held high as a default condition by the inverter 354. If the line one select button 224 is pushed, the inventor 354 changes the high signal to a low signal so that pin 378 goes low and the AND gate 350 is disabled. The data signal outputted by the AND gate 350 is transmitted to the pins 358 and 362 over a pair of leads 386 and 390, respectively. An inverter 394 inverts the data signal before it reaches the pin 358.

The clock signal that is transmitted to the pins 370 and 374 is generated when the speaker phone button 220 is pushed; when the hook switch 228 goes off hook; and when the line one button 224 or the line two button 232 is depressed. When the pin 370 receives a clock signal, it causes the pin 306 to achieve the same state as the pin 358 at the time the clock signal is received (i.e. if pin 358 is high, pin 306 will go high). Similarly, when the pin 374 receives a clock signal, it causes the pin 342 to achieve the same state as the pin 362 at the time the clock signal is received.

An example of the way the digital circuit 48 functions is as follows: When a telephone call comes into the telephone set 10 on line one, the ringer 91 on line one signals an incoming call, preferably with an audible ring. Pin 382 in the AND gate 350 is low because an incoming call on line one will not cause it to go high. Therefore, the data signal outputted by AND gate 350 is low, and this causes pin 362 to be low. However, the inverter 394 inverts the low signal from AND gate 350, causing pin 358 to be high. If the handset 28 is picked up, the hook switch 228 goes off hook causing a clock signal to be transmitted to pins 370 and 374. Since pin 358 is high when the clock signal arrives at pin 370, pin 306 goes high, causing pin 314 to go high. The off-hook condition also causes the AND gate 322 to output a high signal on lead 326, causing pin 318 to go high. With pins 314 and 318 both high, AND gate 310 causes lead 60 to go high, thereby starting the sequence of events that causes line one to be connected to the telephone circuit 52, as was described previously with respect to the analog circuit 44.

In another illustration of the present invention, when the telephone set 10 is not ringing and the handset is picked up, an available line is connected using the following logic sequence in digital circuit 48: Since the line two select button 232, the line one busy input 264 and the line two ring input 268, are not active, the pin 382 is low. Therefore, the data signal outputted by the AND gate 350 is low, pin 358 is high and pin 362 is low. A clock signal is generated by the off-hook status of switch 228, thereby generating the input that turns pin 370 high. Therefore pins 314 and 318 are high and line one is selected for placing the outgoing call by sending a high signal on lead 60. In contrast, if the handset was picked up and the line two select button 232 was pressed, the data signal would be high, pin 362 would be high and pin 358 would be low. Therefore, line 64 would be high, and line two would be selected for placing the outgoing call.

The speaker phone is controlled by a flip-flop circuit 400. The flip-flop circuit 400 outputs a high signal on a lead 404 when the speaker phone button 220 is pushed. The high signal lead 404 generates a clock signal for the pins 370 and 374 in the flip-flop circuits 302 and 346. Pushing the speaker phone button 220 also sends a low signal on a lead 408 that is used to force the pins 318 or 334 high. Power for controlling the speaker phone operations and flip-flop 400 is supplied by a VCC lead 412 which is connected to the VCC lead 198.

When the handset 28 is on hook, and a line is not being used, if one of the line select buttons 224 or 232 are pushed, the speaker phone will automatically come on for the line corresponding to the button that was pushed. The digital circuit 48 causes this to happen by using an AND gate 418 to generate a speaker select input. The speaker phone is then turned on in a similar manner as was described previously for the case where the speaker phone button 220 is pushed.

Hook switch logic functions are controlled by a flip-flop circuit 420. Input for the flip-flop circuit 420 comes from the hook switch 236 which mimics the state of hook switch 228. When the hook switch 236 is in an off-hook condition, the flip-flop circuit 420 outputs a low signal on a lead 428 that is used to force the pins 318 or 334 high. Power for the flip-flop circuit 420 is supplied by a VCC lead 414. Similarly, all of the other flip-flops, inverters and AND gates in the digital circuit 48 receive power from a VCC lead (not shown) connected to the VCC lead 198.

Conference calls are connected by pressing the conference call button 240 which causes the flip-flop circuits 302 and 346 to force both of the pins 314 and 338 high so that both line one and line two will be connected.

The dual unit flip-flop circuits 400 and 420 are commercially available from Motorola, as part number 74HC109N. The flip-flop circuits 302 and 346 are commercially available as a dual unit from Motorola, as part number 74HC112N. The AND gates in the digital circuit 48, including AND gates 310, 330, 350, are commercially available from Motorola, as part number 74HC08AN. The inverters shown in FIG. 2 are available from Motorola as part number 74HC14AN.

Referring to FIG. 2, the present invention functions as follows: When the digital circuit 48 decides that line one should be selected, a high signal is transmitted on lead 60 from the digital circuit 48 to the MOSFET 98. When the gate of MOSFET 98 goes high, MOSFET 98 turns on causing the gate of MOSFET 102 to go low and the base of transistor 128 to go low. With the gate of MOSFET 102 low, MOSFET 102 turns on connecting the positive line one voltage (present at node 74) to the voice circuit 52, as well as to the emitter of transistor 128. With the base of the transistor 128 low, transistor 128 turns on causing the gate of MOSFET 94 to go high, thereby turning on MOSFET 94. With MOSFET 94 turned on, the negative line one voltage (present at node 78) is connected to the ground 180 of the common circuit 56. The ring lead 18 is connected to the common (voice circuit) ground 180 via the lead 80, thereby completing the connection that allows the a telephone call to be completed on line one using the telephone voice circuit 52. Thus, the MOSFETS 102 and 94 act as switch means for connecting the tip and ring leads (leads 14 and 18) to the voice circuit 52.

If the digital circuit 48 had decided that line two should be selected, a high signal is transmitted on lead 64 instead of on lead 60, and MOSFET 148 would have been turned on instead of MOSFET 98, thereby connecting the tip and ring leads 22 and 26 to the voice circuit 52. An important feature of the present invention is that when line one is being used, line two is isolated from the ground 180 because the MOSFET 144 is off. This means that if the ringer 95 on line two begins ringing, the ringing will not be heard on line one. Similarly, if line two is being used, ringing on line one will not be heard on line two.

A major advantage of the present invention is that an external power source is not required to provide power to either the analog circuit 44 or the digital circuit 48. Instead, all of the required power is drawn directly from the telephone lines one (leads 14 and 18) and two (leads 22 and 26).

The VCC leads 412, 414 and 270 indicate junctions where the three volt power supply from the capacitor 196 is inputted to the digital circuit 48. Similarly, all of the AND gates in the digital circuit 48 are powered from the three volt power supply from the capacitor 196. An advantage of the present invention is that the circuit 40 is powered completely by the line voltage from line one and line two, which is used to charge the capacitor 196. This means that the telephone set 10 does not require a separate power cord to connect the telephone set 10 to a power supply, such as a wall plug.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A multi-line telephone system:

multiple telephone lines each line including a tip and ring lead pair;

an energy storage unit that draws a small amount of current from at least one tip and ring lead pair when the phone is in the on-hook condition; and a circuit at least partially powered by the energy storage unit that automatically selects from the multiple telephone lines a line with an incoming call when the telephone is put in the off-hook condition wherein more than one of the multiple telephone lines are connectable to a telephone circuit at the same time to provide for a conference call.

2. The multi-line telephone system of claim 1, wherein the energy storage unit includes a capacitor.

3. The multi-line telephone system of claim 1, wherein circuit includes switch units controlled by a control logic unit.

* * * * *